(12) United States Patent
Millan

(10) Patent No.: US 9,028,000 B2
(45) Date of Patent: May 12, 2015

(54) SEAT HEADREST

(76) Inventor: Sergio Millan, Chino, CA (US)

(*) Notice: Subject to any disclaimer, the term of this patent is extended or adjusted under 35 U.S.C. 154(b) by 574 days.

(21) Appl. No.: 13/413,405

(22) Filed: Mar. 6, 2012

(65) Prior Publication Data

US 2013/0234490 A1    Sep. 12, 2013

(51) Int. Cl.
*A47C 1/10* (2006.01)
*A47C 7/38* (2006.01)
*B60N 2/48* (2006.01)
*B60N 2/24* (2006.01)

(52) U.S. Cl.
CPC ............. *A47C 7/38* (2013.01); *B60N 2/4808* (2013.01); *B60N 2/24* (2013.01)

(58) Field of Classification Search
CPC .. B60N 2/4808; B60N 2/4805; B60N 2/4817; B60N 2/4879; A47C 7/38; A47C 1/036
USPC .......................... 297/410, 406, 391
See application file for complete search history.

(56) References Cited

U.S. PATENT DOCUMENTS

| | | | | |
|---|---|---|---|---|
| 6,467,846 B2* | 10/2002 | Clough | ......................... | 297/410 |
| 7,040,705 B2* | 5/2006 | Clough | ......................... | 297/410 |
| 7,264,313 B2* | 9/2007 | Clough | ......................... | 297/407 |
| 7,364,239 B2* | 4/2008 | Clough | ......................... | 297/391 |
| 7,500,721 B2* | 3/2009 | Beroth et al. | ................. | 297/410 |
| 2002/0158499 A1* | 10/2002 | Clough | ......................... | 297/410 |

* cited by examiner

*Primary Examiner* — Laurie Cranmer
(74) *Attorney, Agent, or Firm* — James E. Brunton

(57) ABSTRACT

An adjustable headrest that provides both support and comfort to the user and one that can be used in connection with various types of passenger vehicles. The adjustable headrest includes novel slide assemblies that permit multiple height adjustments of the headrest. More particularly, the headrest of the invention can be moved from a first lower position to a second intermediate position and finally to an uppermost position.

11 Claims, 12 Drawing Sheets

SEAT HEADREST

CROSS-REFERENCE TO RELATED APPLICATIONS

Not Applicable.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to headrests for seats. More particularly, the invention concerns a fully adjustable headrest for use in connection with furniture and with passenger vehicles such as aircraft, trains and buses.

2. Description of Related Art Including Information Disclosed Under 37 CFR 1.97 and 1.98

Various types of headrests for use in passenger vehicles have been suggested in the past. As the general rule, these headrests are designed primarily to satisfy safety aspects rather than to provide a comfortable seating posture. Typically, the prior art vehicle headrests comprise only a vertically adjustable head support member designed to provide protection against injury in the event of an accident. However, some vehicle headrests have also been provided with lateral headrest elements. Exemplary of such a headrest is that described in U.S. Pat. No. 5,997,091 issued to Rech et al.

In addition to passenger vehicle headrests, a number of headrests have been designed for use in emergency vehicles. These types of headrests are of a more complicated design and some include greater adjustability features. Exemplary of these types of headrests are those disclosed in U.S. Pat. No. 5,275,462 and in U.S. Pat. No. 5,934,749, both issued to Pond et al.

Even more complex headrests have been designed for use in military aircraft and, more particularly, in military aircraft for use in conjunction with ejection seats. Typical of this class of headrest design are those disclosed in U.S. Pat. No. 4,883,243 and U.S. Pat. No. 4,899,961, both issued to Herndon. Another such headrest design is disclosed in U.S. Pat. No. 4,466,662 issued to McDonald et al.

In addition to the development of headrests for use in military aircraft, significant advances have been made in recent years in the design of headrests for use in commercial aircraft. Many of these headrests are designed for personal comfort and include pivotally movable back and lateral supports. In these latter types of headrests, the head support members are typically slidably mounted on spaced apart rods that extend upwardly from the back of the seat and rely on friction to maintain the headrest in an elevated position.

Exemplary of significantly improved headrests for use with seats and particularly for use with seats in commercial aircraft are those described in U.S. Pat. Nos. 7,264,314, 7,040,705, 6,666,517, 6,467,846 and 6,250,716 all issued to Clough.

As will become clear from the discussion that follows, the headrest of the present invention represents a substantial improvement over the prior art headrests, provides significantly greater adjustability and therefore, provides greater support and comfort to the user.

BRIEF SUMMARY OF THE INVENTION

It is an object of the present invention to provide an adjustable headrest that provides both support and comfort to the user and can be used in connection with furniture including household and office furniture, and also in connection with various types of passenger vehicles.

Another object of the invention is to provide a headrest of the aforementioned character that includes novel slide assemblies for permitting multiple height adjustments of the headrest. More particularly, the headrest of the invention can be moved from a first lower position to a second intermediate position and, finally, to an uppermost position.

Another object of the invention is to provide a headrest of the character described in the preceding paragraphs in which the headrest of the invention can be moved upwardly a distance of about four inches from a first lower position, to a second intermediate position. Uniquely, the headrest can then be moved further upwardly for a distance of about three inches for a total upward travel of the headrest of approximately seven inches. Another object of the invention is to provide easily adjustable, wing-like, side support members that are pivotally connected to a centrally located, vertically adjustable head support member by means of constant torque hinges.

Another object of the invention is to provide a headrest of the aforementioned character in which the headrest assembly is removably connected to a seat connector frame assembly that includes a roller assembly along which the headrest assembly is slidably movable.

Another object of the invention is to provide a headrest as described in the preceding paragraphs that includes a novel spring locking mechanism for releasably locking the headrest assembly to the seat connector frame assembly.

Another object of the invention is to provide a headrest construction of the class described that is of a simple construction and one that can be inexpensively produced and easily installed.

DETAILED DESCRIPTION OF THE INVENTION

Figure 1:
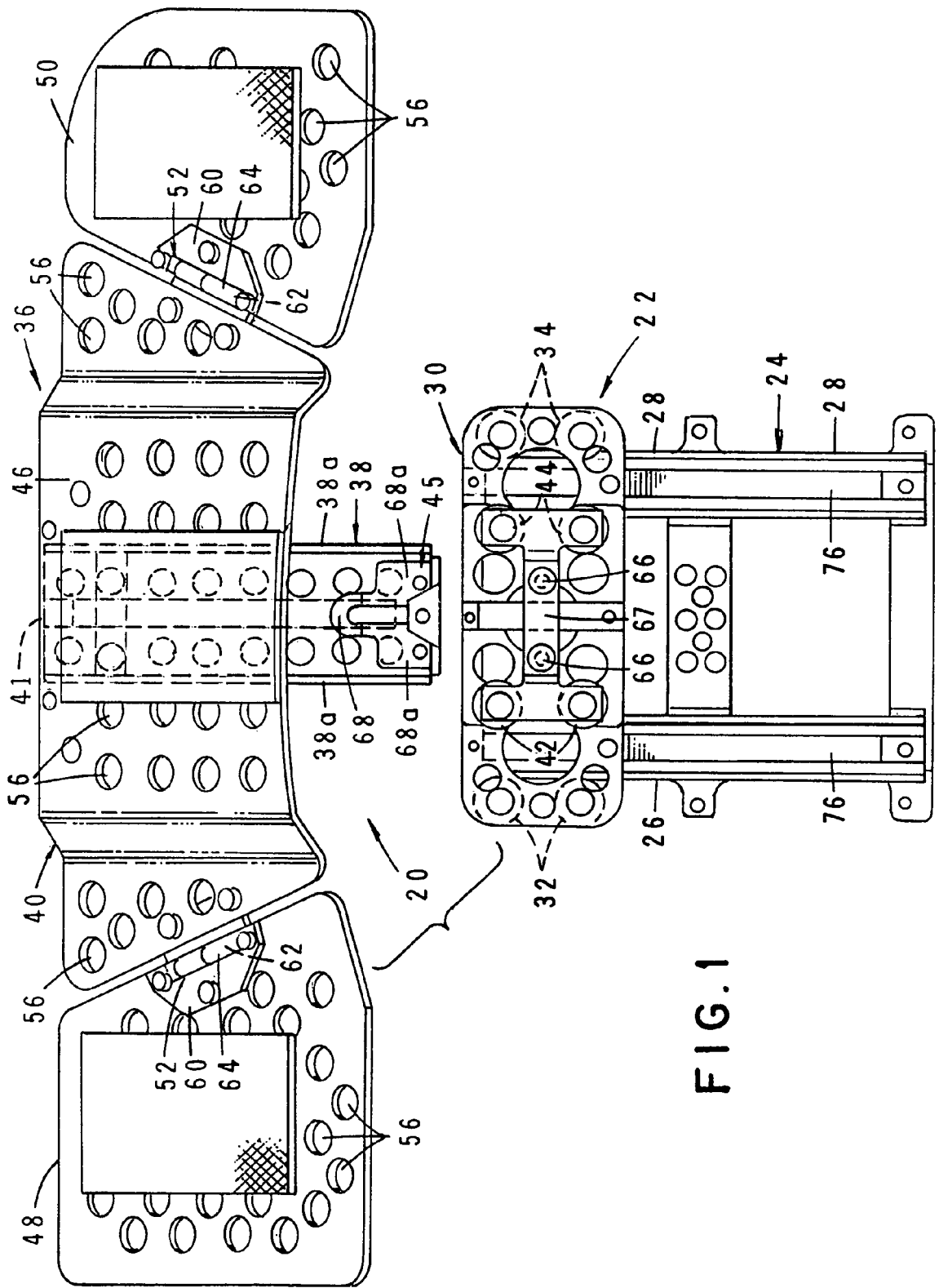
FIG. 1 is an exploded front view of one form of the headrest assembly of the present invention.
Figure 2:
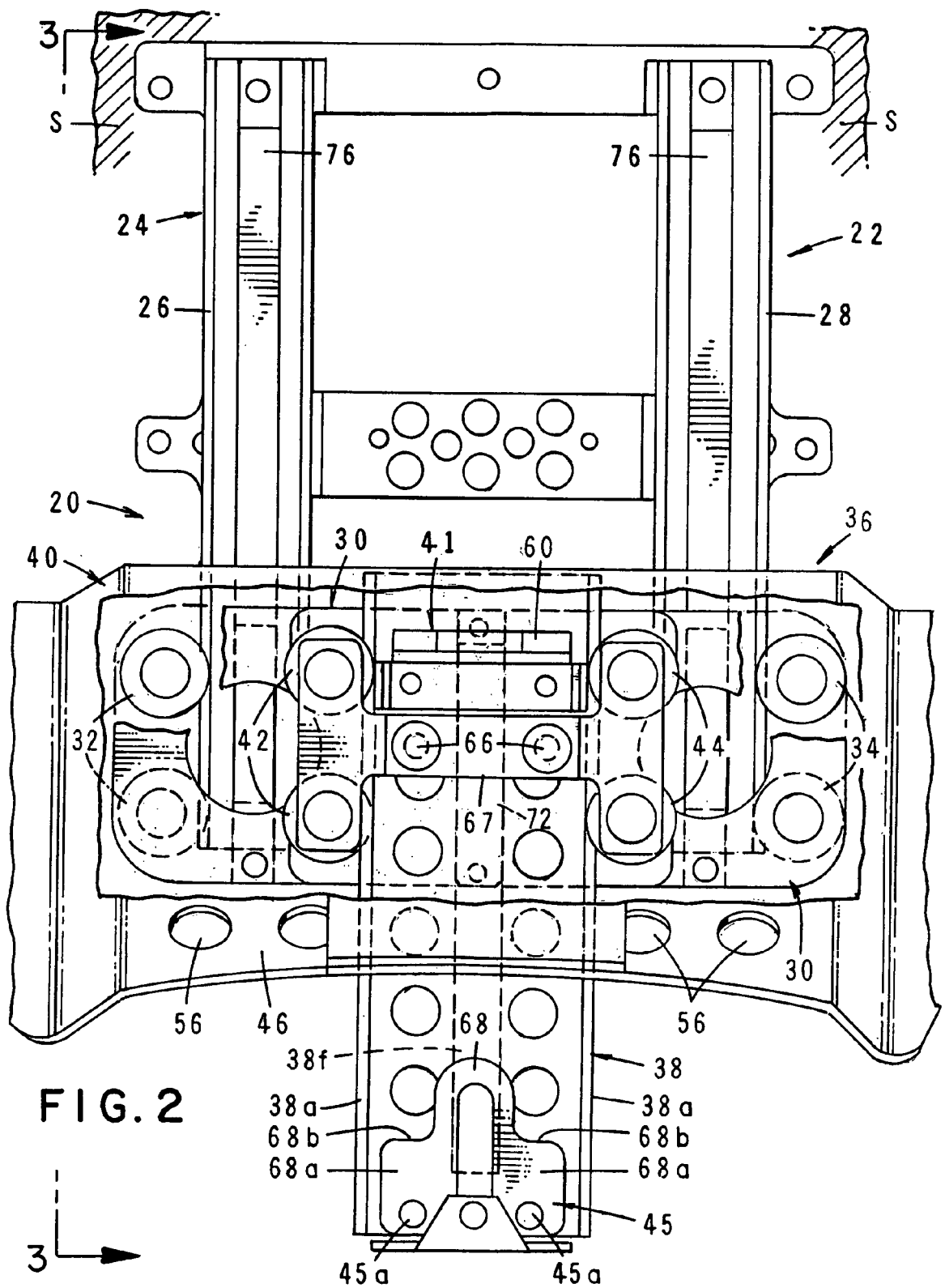
FIG. 2 is a fragmentary front view of the headrest assembly shown in FIG. 1 partly broken away and illustrating the movement of the various components of the assembly.
Figure 5:
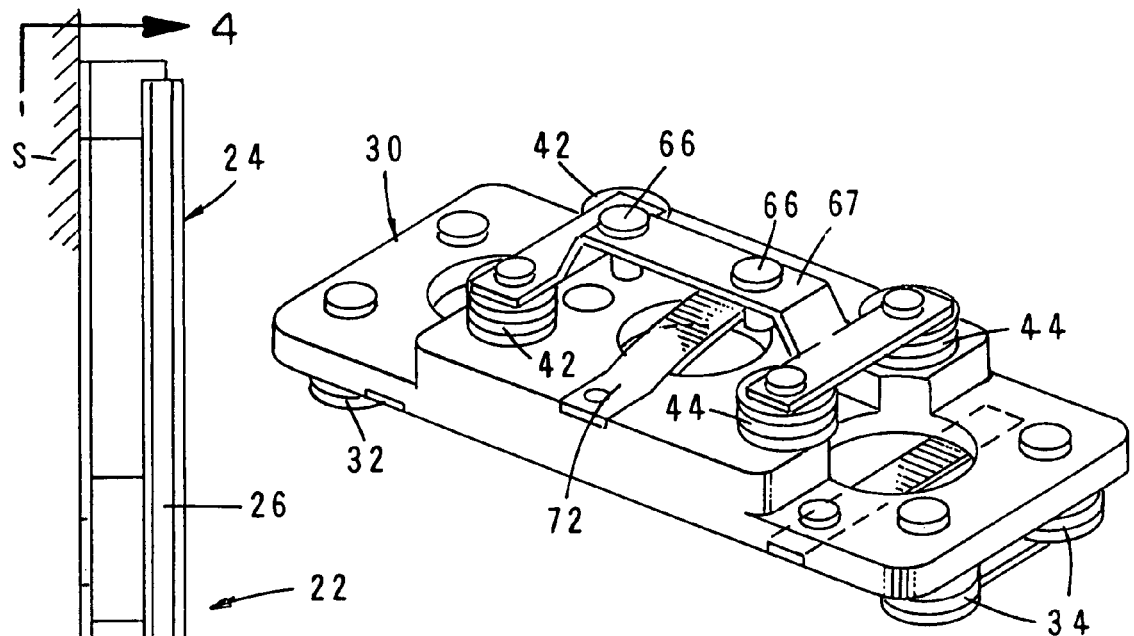
FIG. 5 is a generally perspective view of the roller assembly of the second sub-assembly of the headrest assembly.

Referring to the drawings and particularly to FIGS. 1 through 5, one form of seat headrest assembly of the invention is there illustrated and generally designated by the numeral 20. This embodiment of the invention here comprises first sub-assembly 22 for interconnection with a seat "S" (FIG. 2). First sub-assembly 22 here comprises a seat connector frame 24 having first and second transversely spaced tracks 26 and 28. First sub-assembly 22 also includes a roller sub-assembly 30 (FIG. 5) that is connected to seat connector frame 24 for movement with respect thereto between first and second positions. Roller sub-assembly 30 includes a first set of spaced apart rollers 32 movable along track 26 between first and second positions and a second set of spaced apart rollers 34 movable along track 28 between first and second positions.

Figure 6:
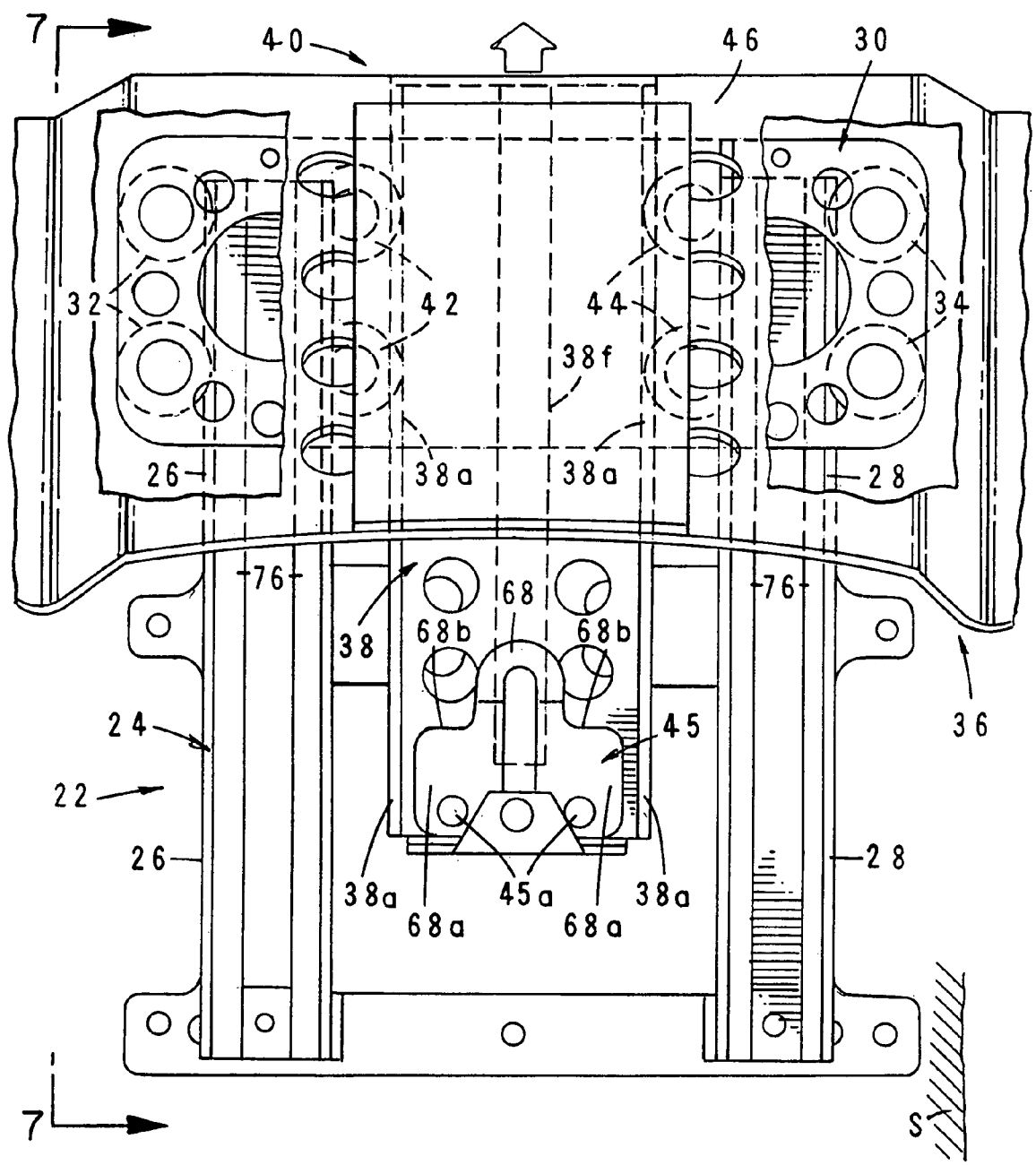
FIG. 6 is front view of the headrest assembly illustrating the movement of the second sub-assembly of the headrest assembly.

Seat headrest assembly 20 also includes a second sub-assembly 36 that is removably connected to first sub-assembly 22 for movement relative thereto between first and second positions. Second sub-assembly 36 here comprises an elongated centrally disposed guide 38 having spaced apart running surfaces 38a and a head support panel assembly 40 that is connected to guide 38 by means of a first friction hinge assembly 41. Head support panel assembly 40 is movable relative to guide 38 between a first position shown in FIGS. 2 and 3 and a second position shown in FIGS. 6 and 7. The character of first hinge assembly 41 which yieldably resists pivotal movement of the support panel assembly relative to guide 38, will presently be described.

As illustrated in FIG. 2, guide 38 is disposed between a third set of spaced apart rollers 42 and a fourth set of spaced apart rollers 44 for movement relative to the third and fourth sets of rollers between first and second positions. As indicated in the drawings, third and fourth sets of spaced apart rollers 42 and 44 comprise a part of roller assembly 30.

Head support panel assembly 40 here comprises a central portion 46 and first and second side panels 48 and 50 respectively that are pivotally connected to the central portion by second friction hinge assemblies 52, the character of which will presently be described (see FIG. 1). As indicated in FIG. 1, central portion 46 and both of the side panels 48 and 50 are provided with a multiplicity of weight reducing apertures 56.

Friction hinge assemblies 41 and 52, each of which includes a connector bracket 60, a shaft portion 62 carried by the connector bracket, and a friction imparting clip 64 disposed in frictional engagement with shaft portion 62 are of conventional construction and are readily commercially available from various sources, including Reell Company of St Paul, Minn. and the Southco company of Concord, Pa.

Figure 3:
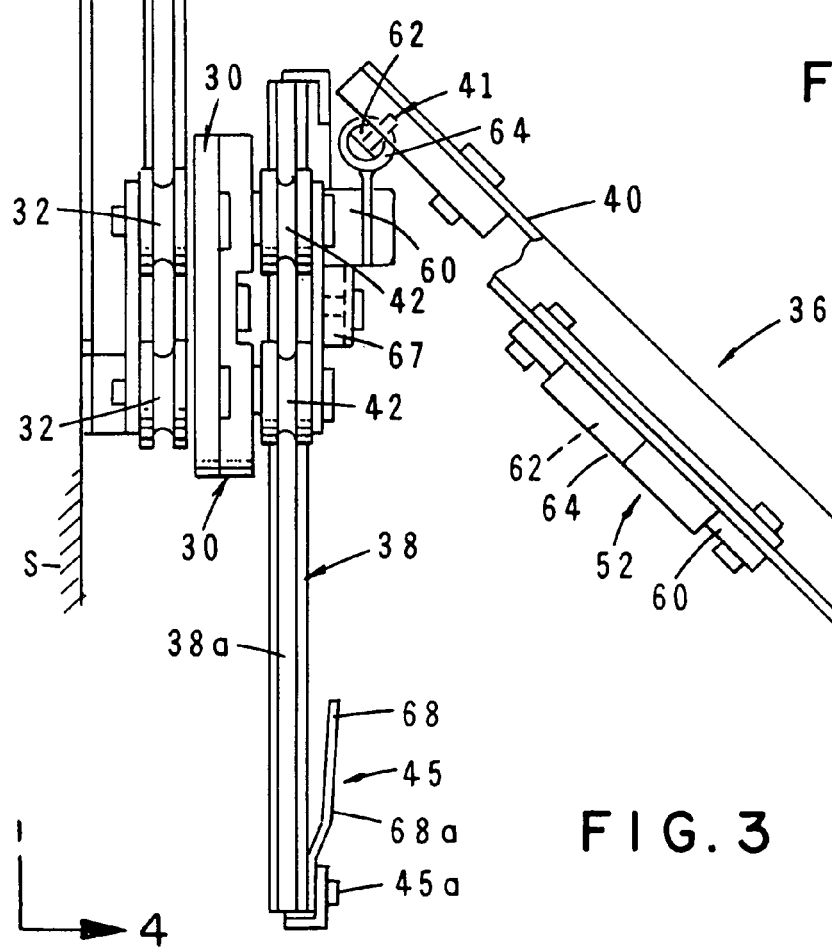
FIG. 3 is a cross-sectional view taken along lines 3-3 of FIG. 2.
Figure 4:
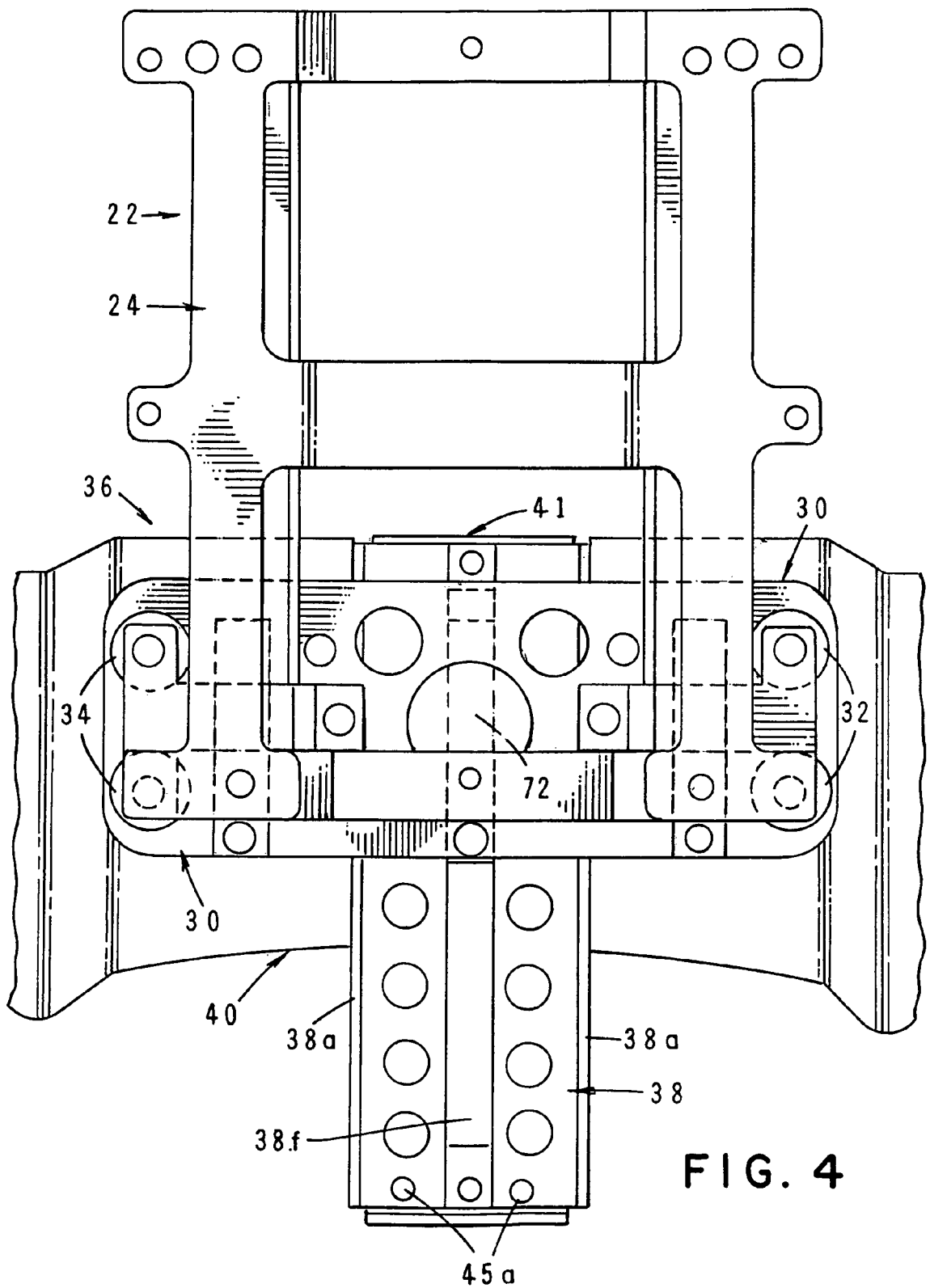
FIG. 4 is a view taken along lines 4-4 of FIG. 3.
Figure 7:
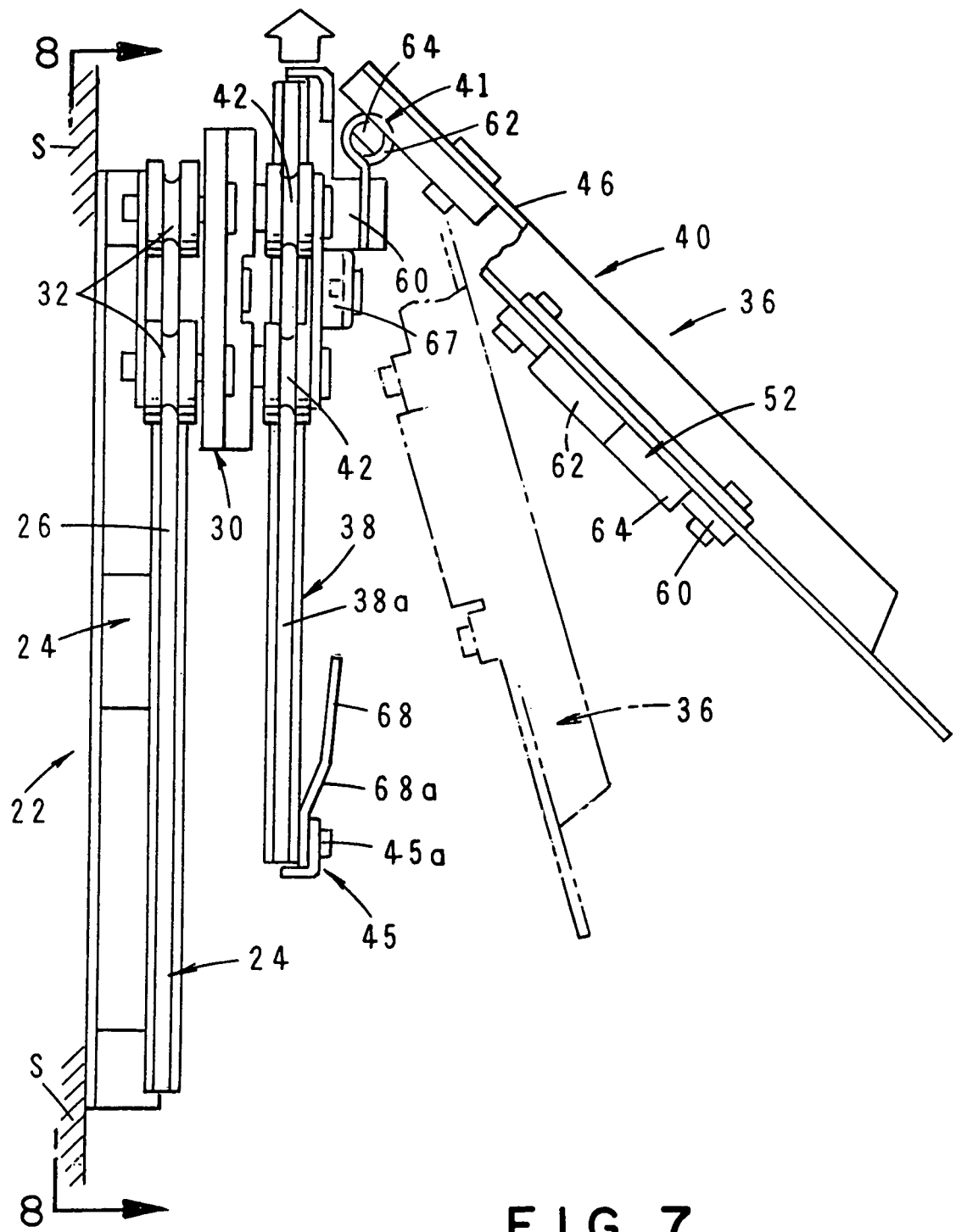
FIG. 7 is a cross-sectional view taken along lines 7-7 of FIG. 6.
Figure 8:
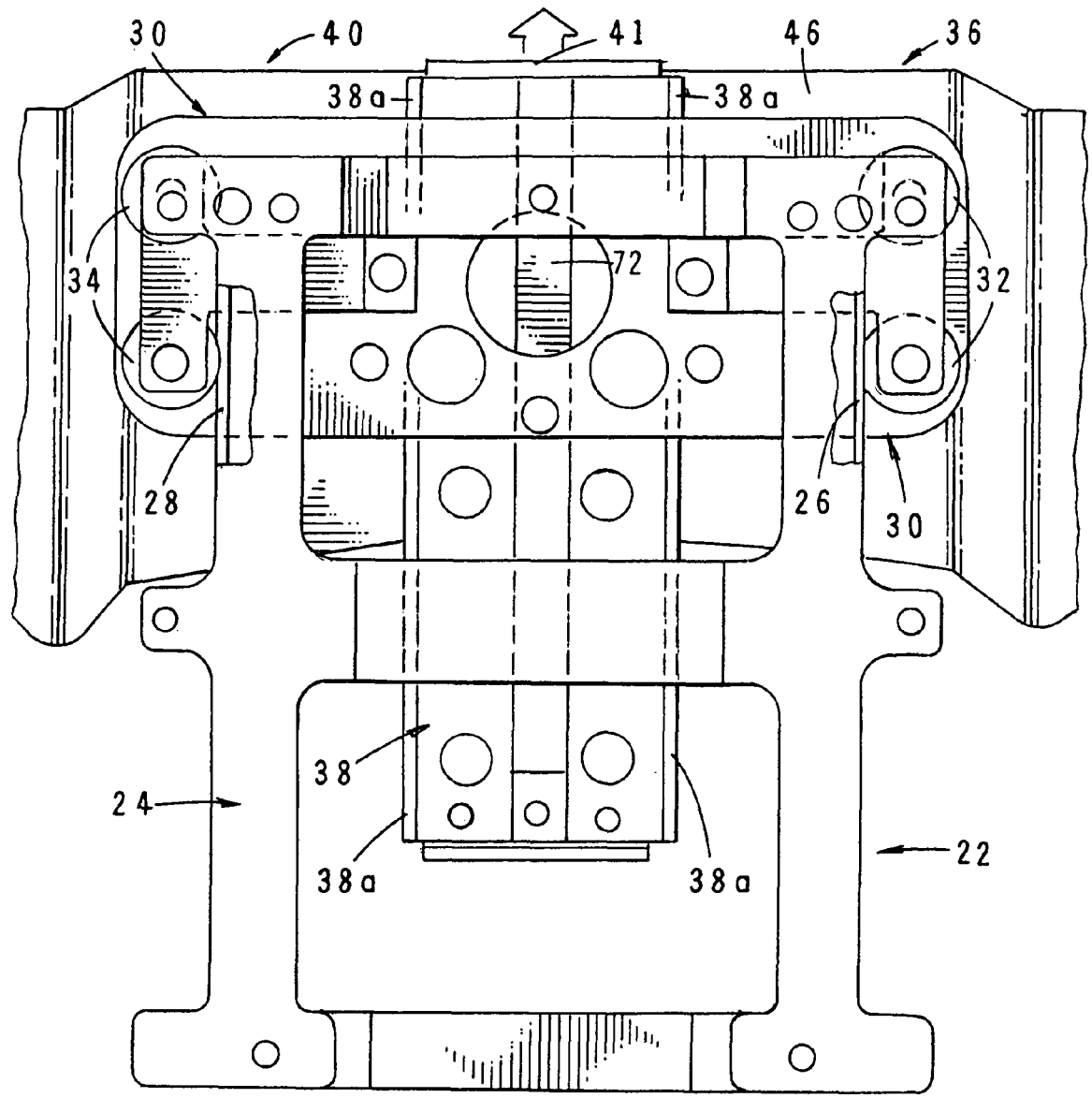
FIG. 8 is a view taken along lines 8-8 of FIG. 7.

With the construction depicted in the drawings, the head support panel assembly 40 can be pivoted about friction hinge assembly 41 into several selected angular positions relative to guide 38 (see for example, FIGS. 3 and 7). Similarly, each of the first and second side panels 48 and 50 can be pivoted about their respective friction hinge assemblies 52 from a substantially coplanar position with central portion 46 as shown in FIG. 1, into several selected angular positions relative to central portion 46.

Figure 14:
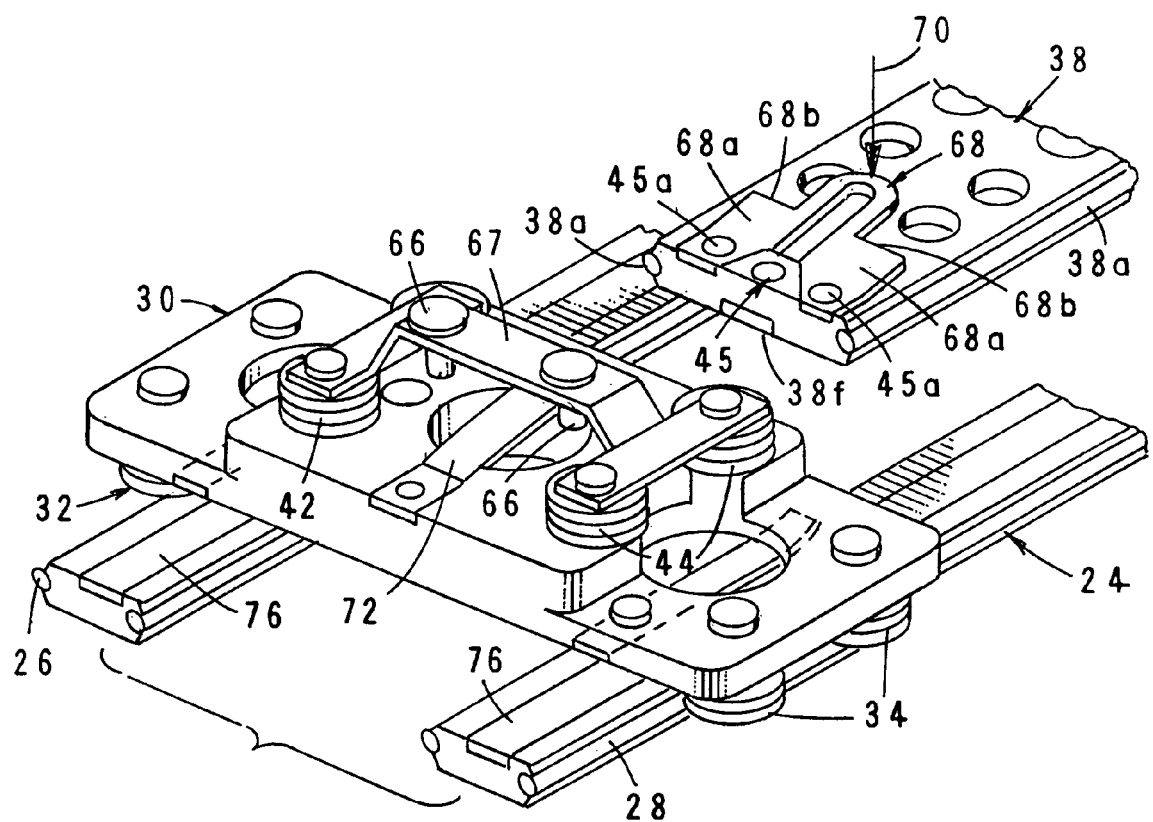
FIG. 14 is a generally perspective, fragmentary view illustrating the headrest locking assembly of the form of the invention shown in FIG. 1.

Once the head support panel assembly 40 is moved relative to first sub-assembly 22 from the first spaced apart position shown in FIG. 1 to a second position wherein the spaced apart running surfaces 38a of guide 38 mates with rollers 42 and 44, the head support panel assembly 40 can be interconnected with the first sub-assembly 22. The method by which the head support panel assembly 40 is interconnected with and disconnected from the first sub-assembly 22 through manipulation of the locking assembly 45 is illustrated in FIG. 14. More particularly, in interconnecting the head support panel assembly 40 with the first sub-assembly 22, an inward pressure exerted on the support panel assembly 40 will cause the locking pins 66, that that are carried by a support 67 that is connected to roller sub-assembly 30, to ride over the side portions 68a of a spring member 68. Spring member 68, along with threaded connectors 45a, comprises the locking assembly 45 of the present form of the invention. Once locking pins ride over the side surfaces, the locking spring will return to the at rest position and the shanks of the pins 66 will lockably engage the shoulders 68b formed on spring 68, thereby blocking removal of the guide 38. Accordingly, to remove the guide it is necessary to depress the locking spring 68 in the direction of the arrow 70 of FIG. 14 so that the shanks of the pins 66 will clear the shoulders 68b.

With the spaced apart running surfaces 38a of guide 38 mated with rollers 42 and 44, the guide can be moved relative to roller sub-assembly 30 from the position shown in FIG. 1 into the position shown in FIG. 2.

The roller sub-assembly 30 of this form of the invention also includes resistance imparting means for imparting resistance to the upward and downward movement of the guide 38. This resistance imparting means here comprises a resistance imparting member shown here as a uniquely configured spring designated in FIG. 14 of the drawings by the numeral 72. When the headrest assembly of the invention is fully assembled, the central portion of the spring is in pressural engagement with the face, 38f of guide 38.

With this construction, as the headrest assembly is moved upwardly and downwardly, spring 72 will yieldably resist sliding movement of the guide 38 in a manner to permit smooth sliding of the headrest assembly 36. It is to be noted that in FIG. 2, the roller sub-assembly 30 has also been moved along tracks 26 and 28 from the upper position shown in FIG. 1 into the lower position shown in FIG. 2. With the apparatus of the invention in the position shown in FIG. 2, the head support panel assembly 40 is in the first lowest possible position. To move the head support panel assembly to the second, intermediate position shown in FIGS. 6 and 7, the roller sub-assembly 30 must be moved upwardly along tracks 26 and 28 of seat connector frame 24. The seat connector frame 24 of this latest form of the invention includes spaced apart running surfaces 76 that are engaged by the roller sub-assembly and function to permit smooth sliding of the roller sub-assembly 30 along the tracks of the seat connector frame. In the present form of the invention, as the roller sub-assembly 30 moves upwardly to the intermediate position shown in FIGS. 6 and 7, the head support panel assembly moves upwardly by a distance of about four inches. To move the head support panel assembly to the third, uppermost position shown in FIGS. 9 and 10, the guide 38 must be moved upward relatively to rollers 42 and 44 of the roller sub-assembly 30. More particularly, an upward force exerted on guide 38 will cause the guide to roll along tracks 42 and 44 and to move the head support panel assembly into the position shown in FIGS. 9 and 10.

Figure 9:
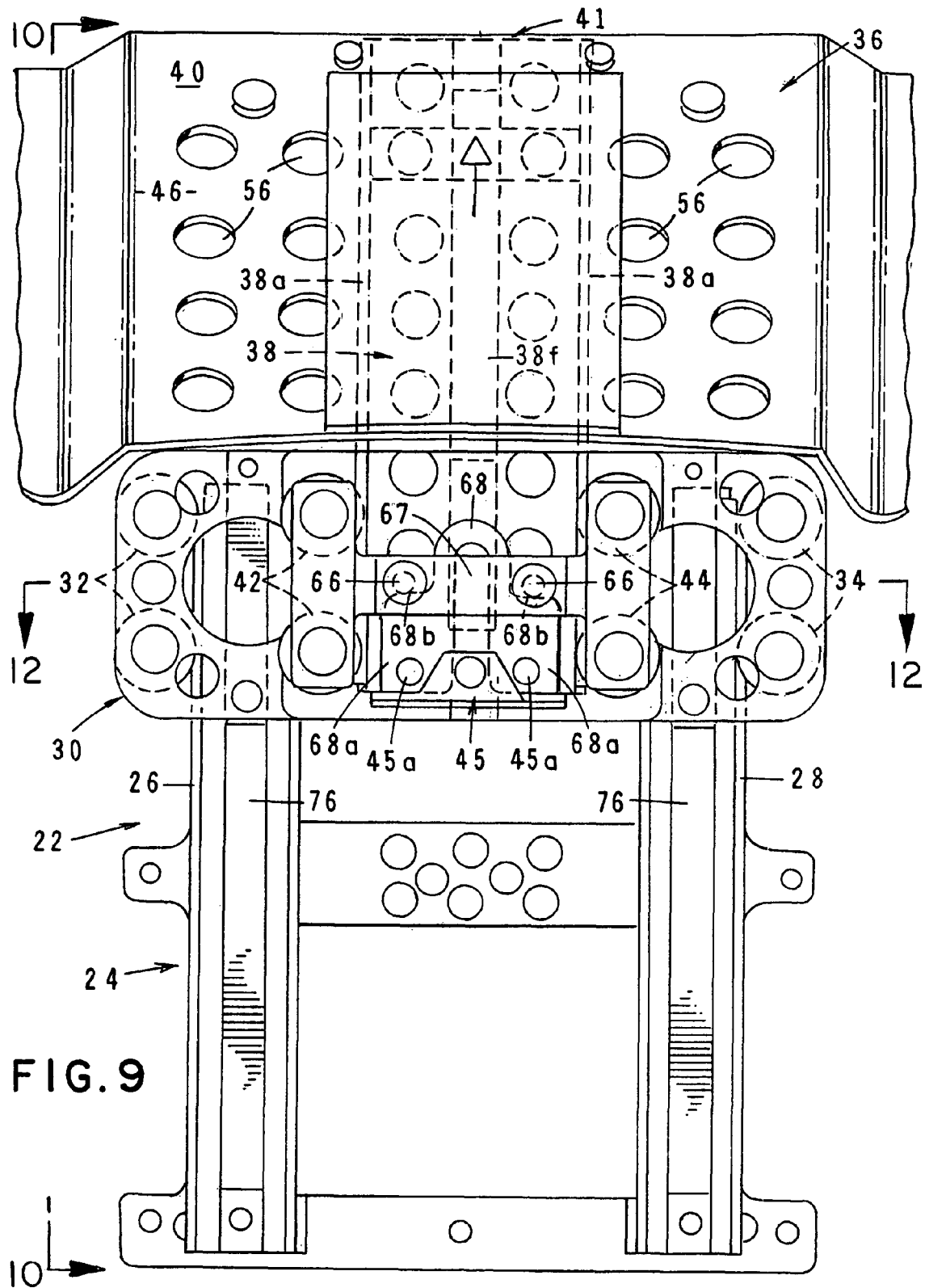
FIG. 9 is a front view of the headrest assembly further illustrating the movement of the various components of the assembly.
Figure 10:
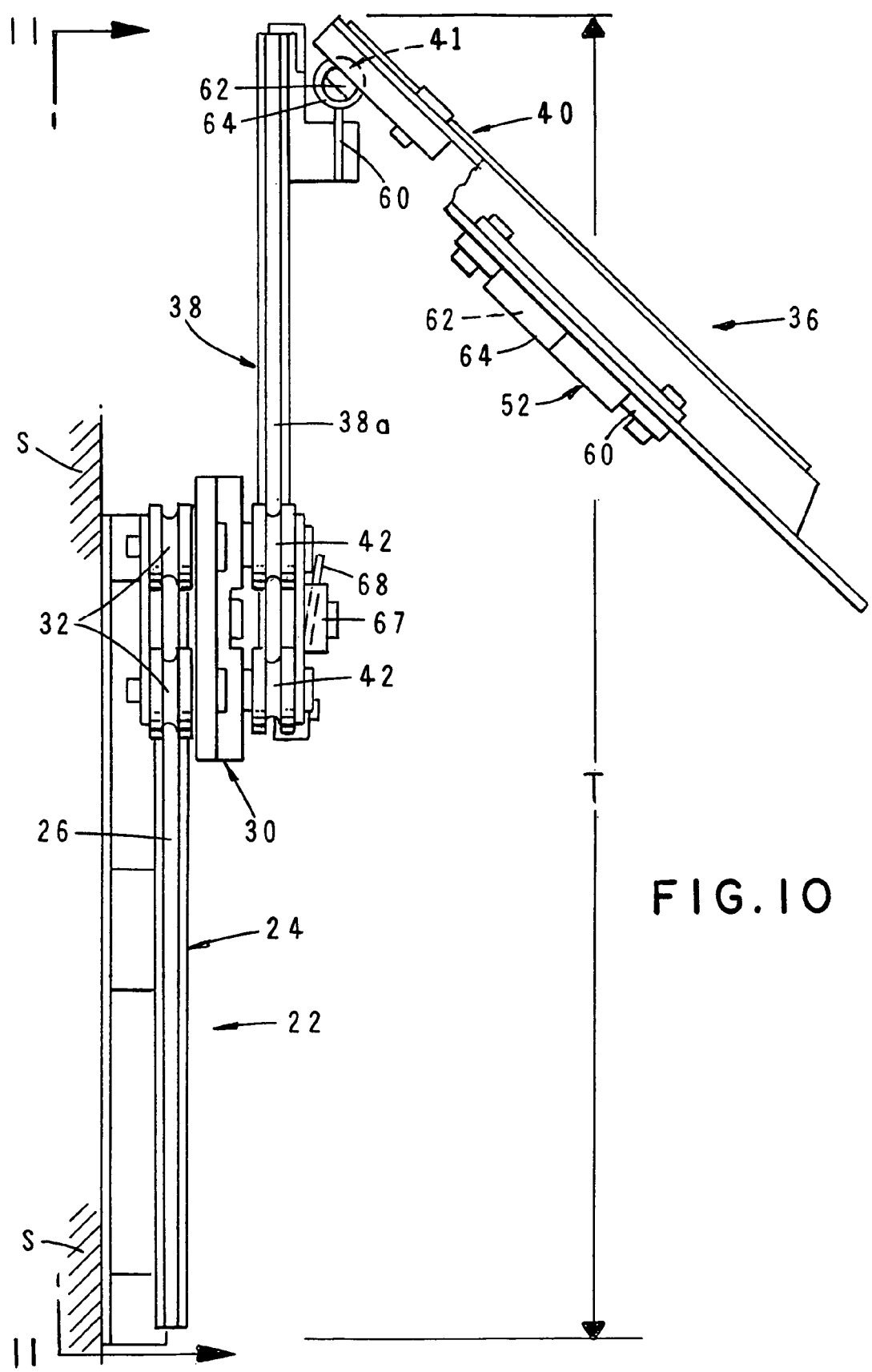
FIG. 10 is a cross-sectional view taken along lines 10-10 of FIG. 9.
Figure 11:
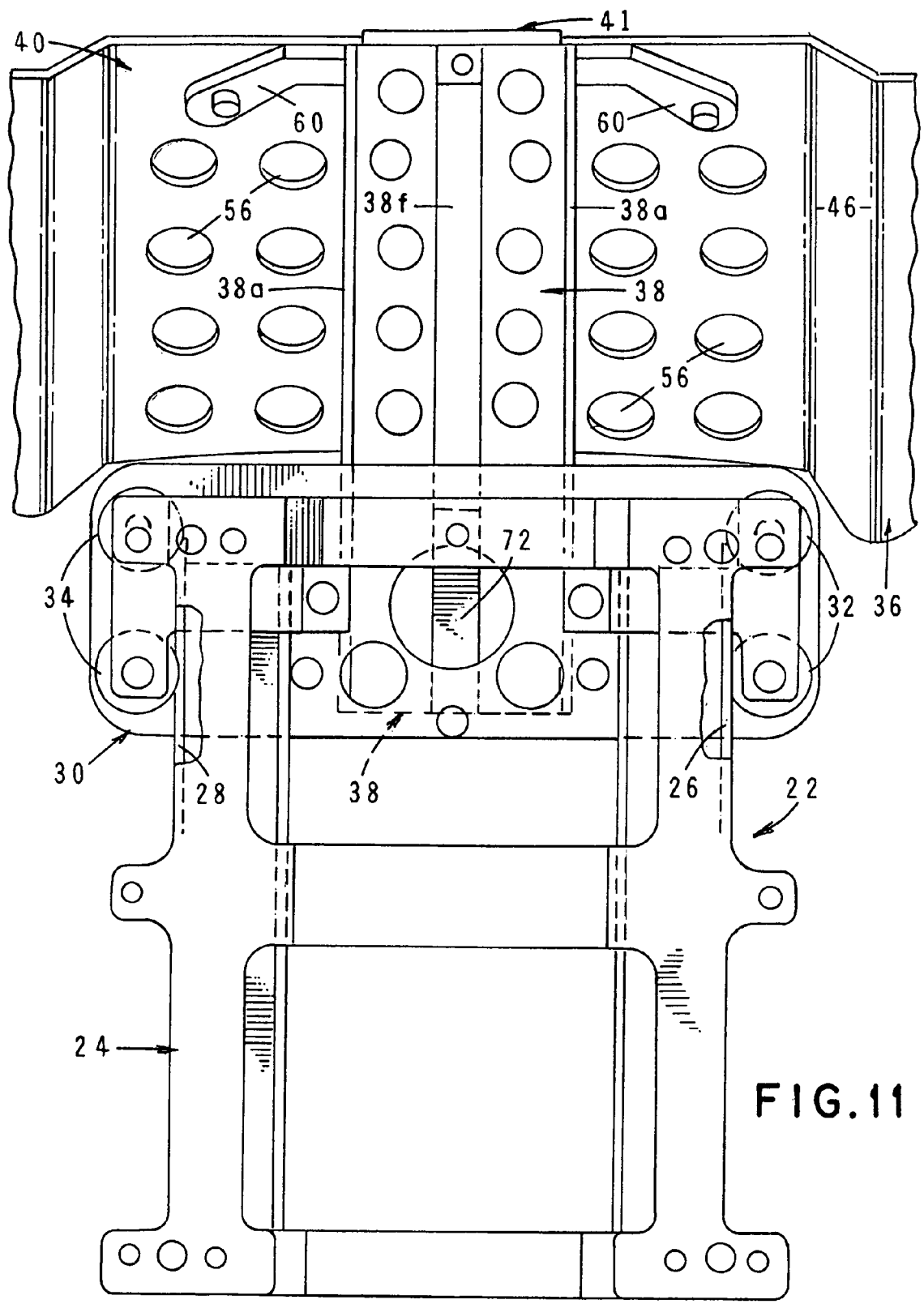
FIG. 11 is a view taken along lines 11-11 of FIG. 10.
Figure 12:
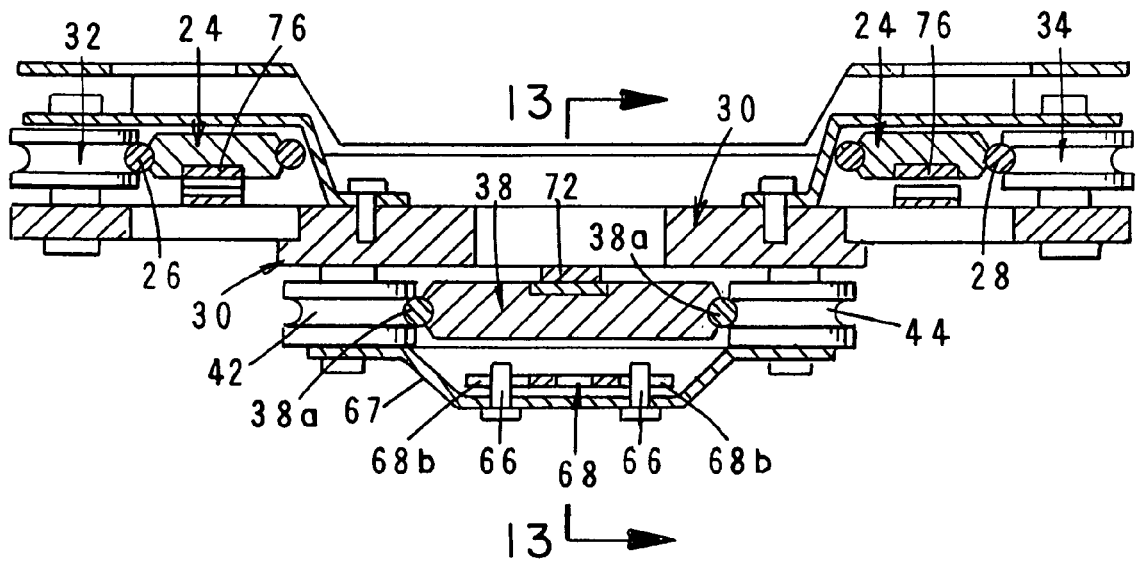
FIG. 12 is a cross-sectional view taken along lines 12-12 of FIG. 9.
Figure 13:
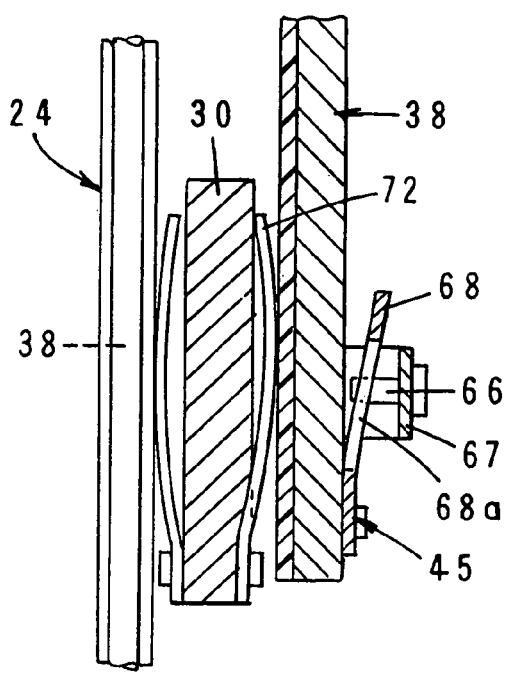
FIG. 13 is a cross-sectional view taken along lines 13-13 of FIG. 12.

In the present form of the invention, as the guide 38 moves upwardly to the uppermost position shown in FIGS. 9 and 10, the head support panel assembly moves upwardly by an additional distance of about three inches for a total upward travel of the head support panel assembly of approximately seven inches.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

The invention claimed is:

1. A seat headrest assembly for interconnection with a seat comprising:
   (a) first sub-assembly connected to the seat, said first sub-assembly comprising:
      (i) first and second transversely spaced tracks;
      (ii) a first set of spaced apart rollers movable along said first transversely spaced track between first and second positions;
      (iii) a second set of spaced apart rollers movable along said second transversely spaced track between first and second positions;
      (iv) a third set of spaced apart rollers; and
      (v) a fourth set of spaced apart rollers;
   (b) a second sub-assembly connected to said first sub-assembly for movement relative thereto between first and second positions, said second sub-assembly comprising;
      (i) an elongated centrally disposed guide disposed between said third and fourth sets of spaced apart rollers for movement relative thereto between first and second positions; and
      (ii) a head support panel assembly connected to said guide.

2. The seat headrest as defined in claim 1 in which said head support panel assembly comprises a central portion and first and second side panels pivotally connected to said central portion.

3. The seat headrest assembly as defined in claim 1 further including a resistance imparting member carried by said first sub-assembly for yieldably resisting movement of said headrest between said first position and said second position, said resistance imparting member comprising a spring disposed in compressive engagement with said elongated guide.

4. The seat headrest assembly as defined in claim 1 in which said first sub-assembly is removably connected to said second sub-assembly.

5. The seat headrest assembly as defined in claim 4 further including a locking assembly carried by said centrally disposed guide of said second sub-assembly for preventing removal of said first assembly from said second assembly.

6. The seat headrest assembly as defined in claim 5 in which said locking assembly comprises a spring member connected to said centrally disposed guide of said second sub-assembly.

7. A seat headrest assembly for interconnection with a seat comprising:
   (a) first sub-assembly connected to the seat, said first sub-assembly comprising:
      (i) first and second transversely spaced tracks;
      (ii) a first set of spaced apart rollers movable along said first transversely spaced track between first and second positions;
      (iii) a second set of spaced apart rollers movable along said second transversely spaced track between first and second positions;
      (iv) a third set of spaced apart rollers; and
      (v) a fourth set of spaced apart rollers; and
   (b) a second sub-assembly connected to said first sub-assembly for movement relative thereto between first and second positions, said second sub-assembly comprising;
      (i) an elongated guide disposed between said third and fourth sets of spaced apart rollers of said first sub-assembly for movement relative thereto between first and second positions; and
      (ii) a head support panel assembly connected to said guide, said guide being disposed between said third and fourth sets of spaced apart rollers, said head support panel assembly comprising a central portion and first and second side panels pivotally connected to said central portion.

8. The seat headrest assembly as defined in claim 7, further including a resistance imparting member carried by said first sub-assembly for yieldably resisting movement of said head support panel assembly, said resistance imparting member comprising a spring disposed in compressive engagement with said elongated guide.

9. The seat headrest assembly as defined in claim 7 in which said first sub-assembly is removably connected to said second sub-assembly.

10. The seat headrest assembly as defined in claim 9, further including a locking assembly carried by said elongated guide of said second sub-assembly for preventing removal of said first sub-assembly from said second sub-assembly.

11. The seat headrest assembly as defined in claim 10 in which said locking assembly comprises a spring member connected to said elongated guide of said second sub-assembly.

* * * * *